US012736645B2

(12) United States Patent
Du et al.

(10) Patent No.: US 12,736,645 B2
(45) Date of Patent: Sep. 15, 2026

(54) SYSTEM LEARNING UPDATE FOR ONLINE SENSOR ALIGNMENT

(71) Applicant: GM Global Technology Operations LLC, Detroit, MI (US)

(72) Inventors: Xinyu Du, Oakland Township, MI (US); Yao Hu, Sterling Heights, MI (US); Wende Zhang, Birmingham, MI (US); Binbin Li, Columbus, OH (US); Hao Yu, Troy, MI (US); Yilu Zhang, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 177 days.

(21) Appl. No.: 18/734,771

(22) Filed: Jun. 5, 2024

(65) Prior Publication Data

US 2025/0377446 A1 Dec. 11, 2025

(51) Int. Cl.
*G01S 7/497* (2006.01)
*G01S 17/931* (2020.01)

(52) U.S. Cl.
CPC .......... *G01S 7/4972* (2013.01); *G01S 17/931* (2020.01)

(58) Field of Classification Search
CPC .... G01S 7/4972; G01S 17/931; G01S 13/865; G01S 2013/9316; G01S 7/40; G01S 13/931; G01S 7/497; G01S 7/4026; G01S 7/52004; G01S 17/89; G01S 17/933; G01S 13/86; G01S 13/867; G01S 2013/9323; G01S 2013/93271; B60W 2050/0083; B60W 50/04; B60W 60/00; B60W 60/001; B60W 50/00; B60W 50/0205; G06N 20/00; G06N 3/0464; G06N 3/08; G06N 3/09; G01C 25/00; G01C 25/005; G08G 1/0112;
(Continued)

(56) References Cited

U.S. PATENT DOCUMENTS 11,623,658 B1 * 4/2023 Charland ................ G01S 17/66 701/23
12,578,429 B1 * 3/2026 Du .......................... G01S 7/403
(Continued)

FOREIGN PATENT DOCUMENTS

CN 112578396 A * 3/2021 ............... G01S 7/48
DE 102013202193 A1 8/2014
(Continued)

*Primary Examiner* — Resha Desai
*Assistant Examiner* — Remash R Guyah
(74) *Attorney, Agent, or Firm* — Honigman LLP; Matthew H. Szalach

(57) ABSTRACT

A system and method for system learning updates for online sensor alignment includes receiving sensor data detected by a sensor system of a vehicle, generating, using a coordinate transformation matrix (CTM), a sensor alignment result, and determining, based on a degradation detection model, that a deviation between the sensor alignment result and one or more of a fleet model, a vehicle model, and a system model exceeds an onboard degradation threshold. The system and method also includes determining, based on an offline degradation model, that a deviation between the sensor alignment result and an offline model result exceeds an offline degradation threshold, and triggering corner case data collection to collect additional sensor data detected by the sensor system of the vehicle.

20 Claims, 7 Drawing Sheets

(58) Field of Classification Search
CPC ............... G08G 1/0129; G08G 1/0141; G08G 1/096716; G08G 1/096725; G08G 1/096741; G08G 1/09675; G08G 1/096775; G08G 1/164; G08G 1/165; G08G 1/166; G08G 1/167; G06F 18/214; G01D 18/00; G06T 7/80; G06V 20/56; G05D 1/00; G05D 1/0088; G05B 13/02
USPC ........... 342/70, 80, 165; 701/1, 30.5, 36, 96, 701/300, 301; 702/94, 97, 150; 356/139, 356/152
See application file for complete search history.

(56) References Cited

U.S. PATENT DOCUMENTS

2013/0242284 A1* 9/2013 Zeng .................... G01S 17/931 356/4.01
2015/0371460 A1* 12/2015 Wenzel .................... G07C 5/08 701/1
2017/0124781 A1* 5/2017 Douillard ............... G08G 1/207
2019/0056484 A1* 2/2019 Bradley ................ G01S 7/4815
2020/0005489 A1* 1/2020 Kroeger .................... G06T 7/85
2020/0209853 A1* 7/2020 Leach ................... G01S 7/4972
2020/0401149 A1* 12/2020 Gong ....................... G06N 3/09
2022/0194412 A1* 6/2022 Zhang ................. B60W 60/001
2023/0266438 A1* 8/2023 Herman .................... G01S 7/40 701/29.9

FOREIGN PATENT DOCUMENTS

DE 102020100027 A1 7/2020
DE 102019119586 A1 1/2021
DE 102021108907 A1 10/2022
DE 102021209315 A1 3/2023

* cited by examiner

SYSTEM LEARNING UPDATE FOR ONLINE SENSOR ALIGNMENT

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates generally to a system and method of system learning updates for online sensor alignment. Generally, non-autonomous and autonomous vehicles require a user to drive a vehicle for a period of time to perform online sensor alignment before autonomous driving features are available. In particular, performing online sensor alignment generates alignment algorithms to translate sensor findings to common coordinates of the autonomous vehicle. Due to the highly mobile nature of vehicles, the alignment algorithms may be sensitive to movement of sensors. In instances where the autonomous vehicle encounters unexpected corner cases while driving, the alignment algorithms would benefit from online adaptation.

SUMMARY

One aspect of the disclosure provides a computer-implemented method for system learning updates for online sensor alignment that when executed on data processing hardware causes the data processing hardware to perform operations that include receiving sensor data detected by a sensor system of a vehicle and generating, using a coordinate transformation matrix (CTM), a sensor alignment result. The operations also include determining, based on a degradation detection model, that a deviation between the sensor alignment result and one or more of a fleet model, a vehicle model, and a system model exceeds an onboard degradation threshold, determining, based on an offline degradation model, that a deviation between the sensor alignment result and an offline model result exceeds an offline degradation threshold, and triggering corner case data collection to collect additional sensor data detected by the sensor system of the vehicle.

Implementations of the disclosure may include one or more of the following optional features. In some implementations, the operations further include generating, based on the additional sensor data, a corrected CTM, and communicating the corrected CTM to the vehicle. In these implementations, generating the corrected CTM and the updated sensor data collection trigger may be based on an offline alignment model trained to generate the corrected CTM based on the sensor data and the additional sensor data.

In some examples, the fleet model includes a statistical average fleet sensor alignment based on the sensor data. In some implementations, the vehicle model includes a statistical average model sensor alignment of vehicle models similar to a model of the vehicle based on the sensor data. In some examples, the system model includes a statistical average sensor alignment of the sensor system of the vehicle based on the sensor data.

In some implementations, determining, based on the offline degradation model, that the deviation between the sensor alignment result and the offline model result exceeds the offline degradation threshold includes generating, using an offline degradation model, the offline model result, providing, as input to a performance model, the sensor alignment result and the offline model result, and receiving, as output from the performance model, an indication that the deviation between the sensor alignment result and the offline model result exceeds the offline degradation threshold. In these implementations, the performance model may include a machine learning model. Alternatively, the performance model may include a rule-based model. In some examples, triggering the corner case data collection to collect the additional sensor data includes collecting a context of the vehicle.

Another aspect of the disclosure provides a system for system learning updates for online sensor alignment that includes data processing hardware and memory hardware in communication with the data processing hardware. The memory hardware stores instructions that when executed by the data processing hardware cause the data processing hardware to perform operations that include receiving sensor data detected by a sensor system of a vehicle and generating, using a coordinate transformation matrix (CTM), a sensor alignment result. The operations also include determining, based on a degradation detection model, that a deviation between the sensor alignment result and one or more of a fleet model, a vehicle model, and a system model exceeds an onboard degradation threshold, determining, based on an offline degradation model, that a deviation between the sensor alignment result and an offline model result exceeds an offline degradation threshold, and triggering corner case data collection to collect additional sensor data detected by the sensor system of the vehicle.

This aspect may include one or more of the following optional features. In some implementations, the operations further include generating, based on the additional sensor data, a corrected CTM, and communicating the corrected CTM to the vehicle. In these implementations, generating the corrected CTM and the updated sensor data collection trigger may be based on an offline alignment model trained to generate the corrected CTM based on the sensor data and the additional sensor data.

In some examples, the fleet model includes a statistical average fleet sensor alignment based on the sensor data. In some implementations, the vehicle model includes a statistical average model sensor alignment of vehicle models similar to a model of the vehicle based on the sensor data. In some examples, the system model includes a statistical average sensor alignment of the sensor system of the vehicle based on the sensor data.

In some implementations, determining, based on the offline degradation model, that the deviation between the sensor alignment result and the offline model result exceeds the offline degradation threshold includes generating, using an offline degradation model, the offline model result, providing, as input to a performance model, the sensor alignment result and the offline model result, and receiving, as output from the performance model, an indication that the deviation between the sensor alignment result and the offline model result exceeds the offline degradation threshold. In these implementations, the performance model may include a machine learning model. Alternatively, the performance model may include a rule-based model. In some examples, triggering the corner case data collection to collect the additional sensor data includes collecting a context of the vehicle.

The details of one or more implementations of the disclosure are set forth in the accompanying drawings and the description below. Other aspects, features, and advantages will be apparent from the description and drawings, and from the claims.

BRIEF DESCRIPTION OF THE DRAWINGS

The drawings described herein are for illustrative purposes only of selected configurations and are not intended to limit the scope of the present disclosure.

Corresponding reference numerals indicate corresponding parts throughout the drawings.

DETAILED DESCRIPTION

Figure 1:
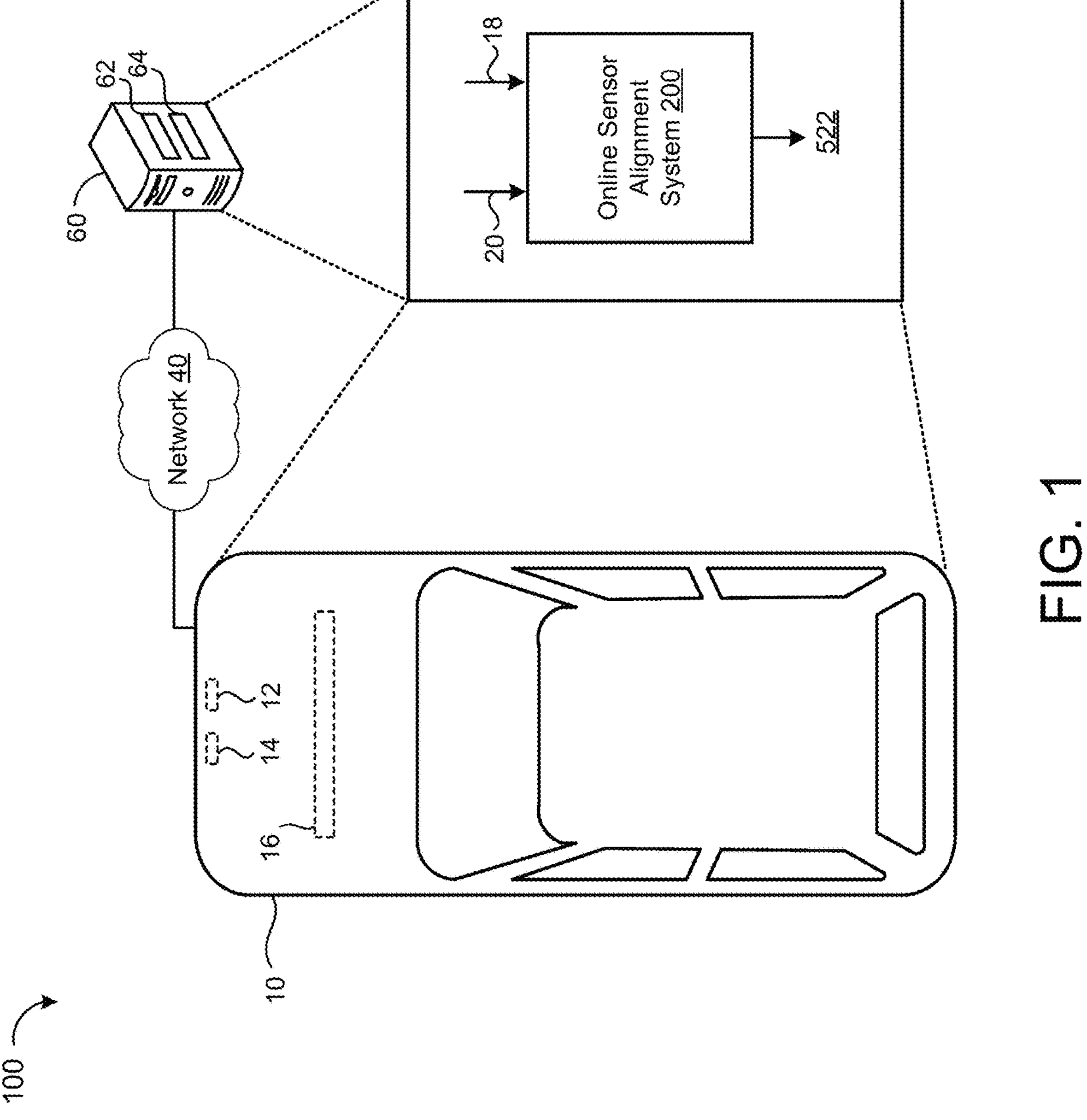
FIG. 1 is a schematic view of an example system for system learning updates for online sensor alignment.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms "first," "second," "third," etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

In this application, including the definitions below, the term "module" may be replaced with the term "circuit." The term "module" may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term "code," as used above, may include software, firmware, and/or microcode, and may refer to programs, routines, functions, classes, and/or objects. The term "shared processor" encompasses a single processor that executes some or all code from multiple modules. The term "group processor" encompasses a processor that, in combination with additional processors, executes some or all code from one or more modules. The term "shared memory" encompasses a single memory that stores some or all code from multiple modules. The term "group memory" encompasses a memory that, in combination with additional memories, stores some or all code from one or more modules. The term "memory" may be a subset of the term "computer-readable medium." The term "computer-readable medium" does not encompass transitory electrical and electromagnetic signals propagating through a medium, and may therefore be considered tangible and non-transitory memory. Non-limiting examples of a non-transitory memory include a tangible computer readable medium including a nonvolatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described herein can be realized in digital electronic and/or optical circuitry, integrated circuitry, specially designed ASICS (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Referring to FIG. 1, in some implementations, a system 100 includes a vehicle 10 and/or a remote system 60 in communication with the vehicle 10 via a network 40. The vehicle 10 and the remote system 60 execute an online sensor alignment system 200 (FIG. 2) configured to detect corner cases that the vehicle 10 encounters while driving and continuously update online coordinate transformation matrices (CTMs) 522 using computing resources of the vehicle 10 and the remote system 60. Briefly, and described in further detail below, the online sensor alignment system 200 continuously receives sensor data 18 detected by a sensor system 16 of the vehicle 10, and updates a CTM 522 of the vehicle 10 to generate a corrected CTM 522C when a degradation of the performance of the sensor system 16 is detected. The online sensor alignment system 200 may update a single sensor 16 of the sensor system 16, or multiple sensors 16 of the sensor system 16.

The vehicle 10 may include a non-autonomous vehicle or an autonomous vehicle (e.g., SAE levels 2-5) that includes data processing hardware 12 and memory hardware 14 storing instructions that when executed on the data processing hardware 12 cause the data processing hardware 12 to perform operations. As shown, the vehicle 10 is in communication with the remote system 60 via the network 40. The remote system 60 (e.g., server, cloud computing environment) also includes data processing hardware 62 and memory hardware 64 storing instructions that when executed on the data processing hardware 62 cause the data processing hardware 62 to perform operations. Notably, execution of the online sensor alignment system 200 is shared across the vehicle 10 and the remote system 60.

Figure 2:
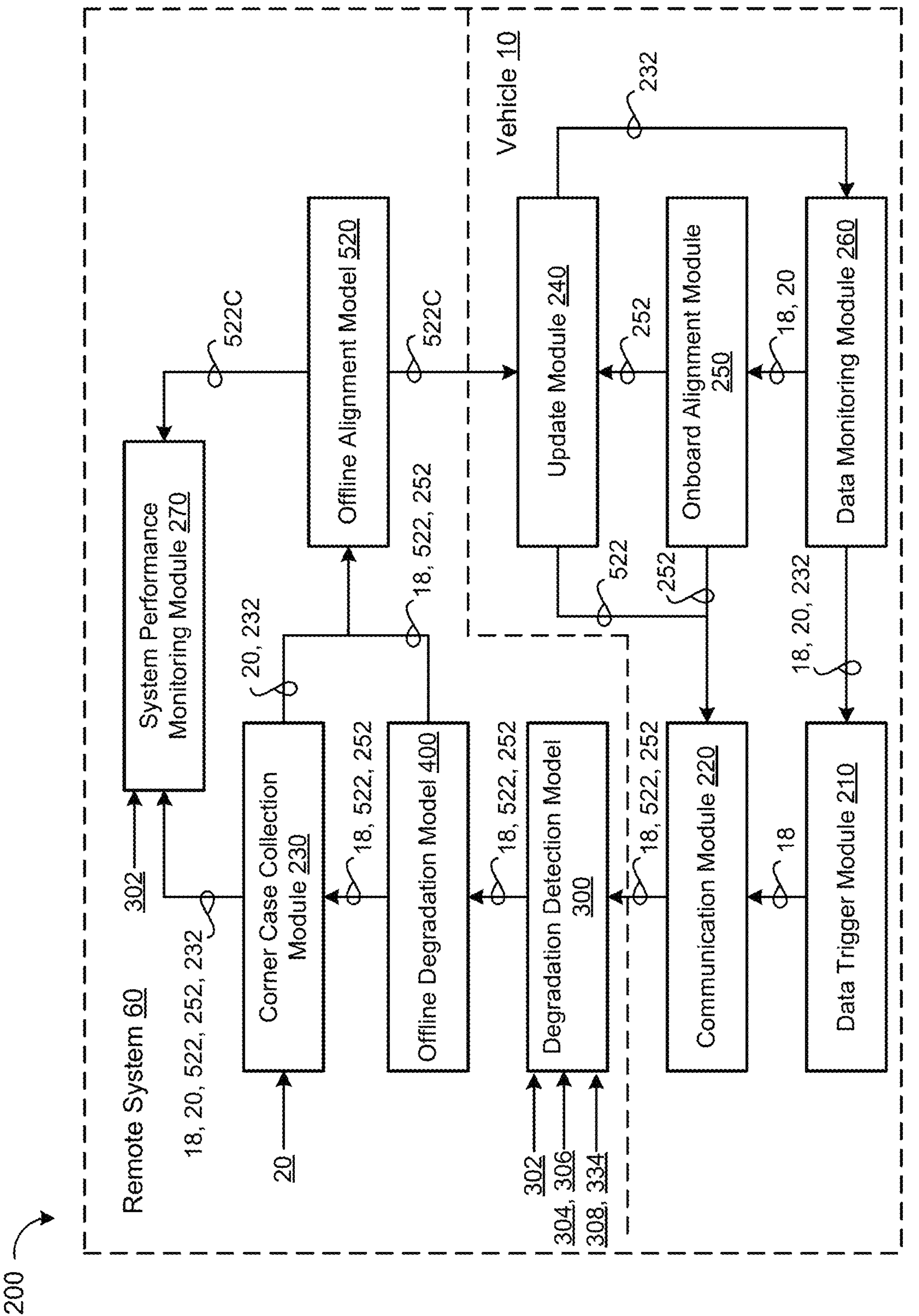
FIG. 2 is a schematic view of example components of the system of FIG. 1.

Additionally, the vehicle 10 includes a sensor system 16 configured to capture sensor data 18 within an environment of the vehicle 10. The vehicle 10 may continuously, or at least during periodic intervals, receive the sensor data 18 captured by the sensor system 16 and determine the context 20 of the vehicle 10. Thereafter, the online sensor alignment system 200 may determine whether the sensor data 18 and/or the context 20 of the vehicle 10 exceed a sensor data collection trigger 232 (FIG. 2). Some examples of sensor data 18 include image data, liDAR data, and/or radar data. The context 20 of the vehicle 10 may include parameters such as the location, speed, driver inputs, distance to other vehicles, vehicle velocity relative to other vehicles, speed into/out of turns, and reaction time. The context 20 may further include the environment of the vehicle 10 such as red lights, pedestrian proximity, construction, crosswalks, and parking.

Referring to FIG. 2, the online sensor alignment system 200 includes a data triggering module 210, a communication module 220, a degradation detection model 300, an offline degradation model 400, a corner case collection module 230, an offboard alignment module 520, an update module 240, an onboard alignment module 250, a data monitoring module 260, and a system performance monitoring module 270. Advantageously, and as shown in FIG. 2, execution of the online sensor alignment system 200 is shared across the vehicle 10 and the remote system 60. In particular, the vehicle 10 may execute (e.g., via the data processing hardware 12 and the memory hardware 14 of FIG. 1) the data triggering module 210, the communication module 220, the update module 240, the onboard alignment module 250, and/or the data monitoring module 260. Here, the remote system 60 may execute (e.g., via the data processing hardware 62 and the memory hardware 64 of FIG. 1) the degradation detection model 300, the offline degradation model 400, the corner case collection module 230, the offboard alignment module 520, and the system performance monitoring module 270. However, it should be understood that any portion of the online sensor alignment system 200 may be executed on either of the vehicle 10 and the remote server 60, or on both the vehicle 10 and the remote server 60.

The data trigger module 210 may be configured to receive the sensor data 18 captured by the sensor system 16 of the vehicle 10, the context 20 of the vehicle 10, and the sensor data collection triggers 232 for the vehicle 10. For example, the data monitoring module 260 may continuously, or periodically, monitor the sensory system 16 of the vehicle 10 and send the sensor data 18 to the data trigger module 210 for monitoring for the sensor data collection triggers 232. The current sensor data collection triggers 232 may define which sensor data 18, if any, will trigger the online sensor alignment system 200 to initiate updates to the CTMs 522. Here, rather than disable one or more sensors 16 of the sensor system 16, the online sensor alignment system 200 may update the CTMs 522 to generate corrected CTMs 522C. In some implementations, the vehicle 10 includes a default data collection trigger 232 generated during the period that the user performs online sensor alignment before autonomous driving features are available (e.g., the default data collection trigger 232 may be a straight-line constant speed).

In response to the data trigger module 210 collecting the sensor data 18 and triggering the online sensor alignment system 200 update, the communication module 220 may upload the sensor data 18 and the associated CTM 522 to the remote server 60 for performance evaluations. In some implementations, the communication module 220 generates, using the CTM 522, a sensor alignment result 252 in coordinates of the vehicle 10 by applying the CTM 522 to the sensor data 18 to translate the coordinates of the sensor system 16 to the coordinates of the vehicle 10. For example, the sensor alignment result 252 may include a CTM estimation, an intermediate result that generates the CTM 522 (e.g., a motion vector value, a normal vector value), an error code/count generated by the sensor alignment system 200, and/or a convergence time indicating how long/how many frames it takes to generate a matured CTM 522.

Figure 3:
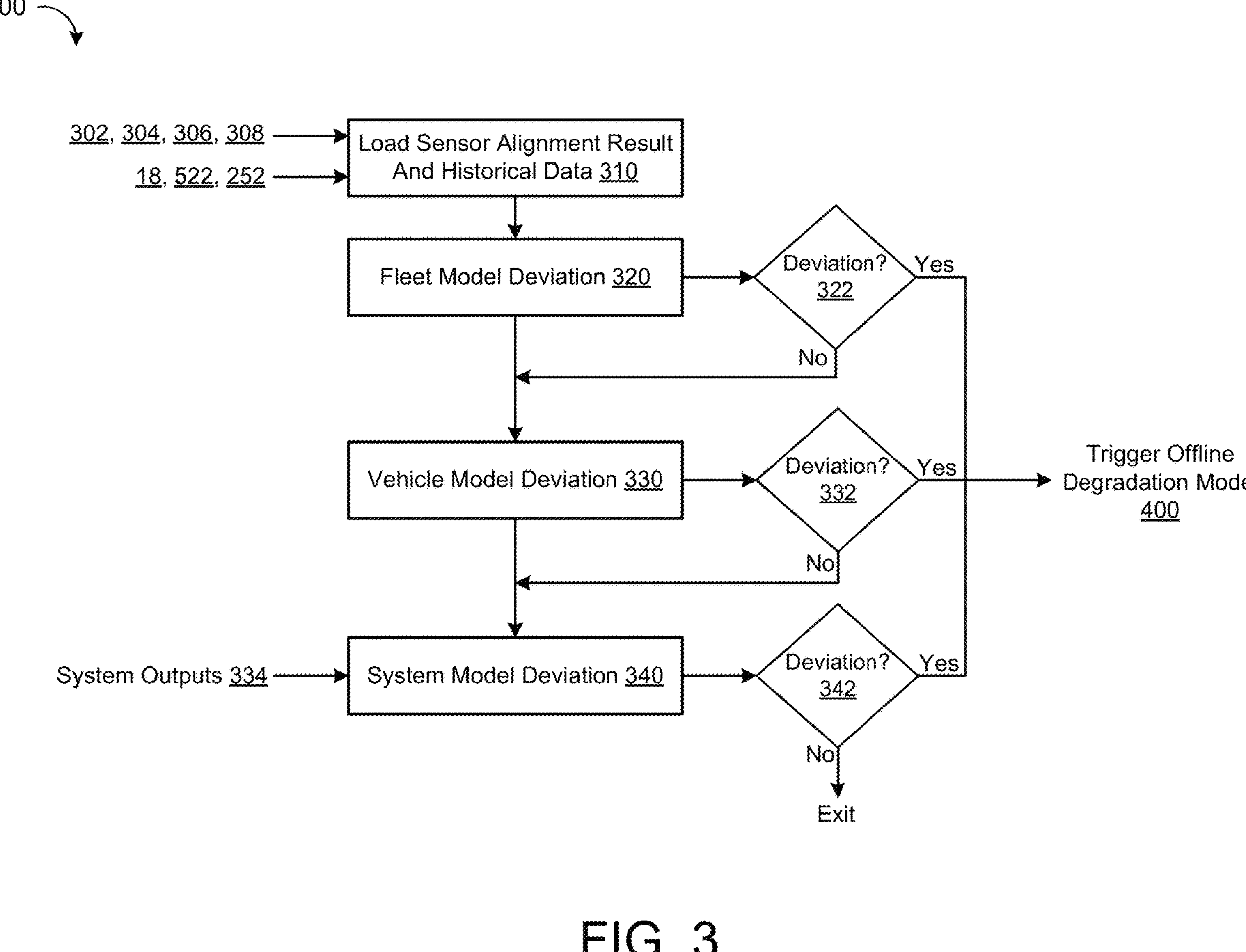
FIG. 3 is a flowchart of an example arrangement of operations for a degradation detection model of the system of FIG. 1.

With reference to FIGS. 2 and 3, the degradation detection model 300 receives, as input, the sensor data 18, the associated CTM 522, and the sensor alignment result 252, and detects whether the sensor alignment result 252 is outside of an expected performance. In some implementations, the degradation model 300 further receives historical alignment data 302 of the vehicle 10. Here, the degradation detection model 300 may perform statistical analysis to compare the sensor alignment result 252 to one or more of a fleet model 304, a vehicle model 306, and a system model 308 and determine whether the sensor alignment result 252 deviates from one or more of the fleet model 304, the vehicle model 306, and the system model 308 by more than an onboard degradation threshold. The fleet model 304 may include average alignment data and/or error codes of all other vehicles of a similar model to the vehicle 10. The vehicle model 306 may include average alignment data and/or error codes for the historical alignment data 302 of the vehicle 10. The system model 308 may include average related system outputs for other systems (e.g., perception system, automated parking, viewing system, etc.) of other vehicles. The onboard degradation threshold is configurable and may vary based on the particular vehicle 10. For example, the onboard degradation threshold may be configured during the manufacturing process of the vehicle 10. In addition to comparing the alignment data and/or error codes, the degradation detection model compares other related indicators, such as convergence time (how long/how many frames it takes to generate a result, generate intermediate results, and/or generate error codes). Additionally or alternatively, the system performance monitoring module 270 pushes updates to the onboard degradation threshold (e.g., in response to a change in performance of the vehicle 10). In some implementations, the onboard degradation threshold for each of the fleet model 304, the vehicle model 306, and the system model 308 is different. For example, the onboard degradation threshold for the fleet model 304 and the system model 308 may be the same, but different from the onboard degradation threshold of the vehicle model 306. In other implementations, the onboard degradation threshold for each of the fleet model 304, the vehicle model 306, and the system model 308 is the same.

With reference to FIG. 3, the degradation detection model 300 is shown. Here, the degradation detection model 300 processes the received sensor data 18, the associated CTM 522, and the sensor alignment result 252, and determines whether the sensor data 18 and/or the sensor alignment result 252 are outside a statistical average (i.e., are bad data). At step 310, in addition to receiving the sensor data 18, the associated CTM 522, and the sensor alignment result 252, the degradation model 300 receives the historical alignment data 302, and the fleet model 304, the vehicle model 306, and the system model 308. Thereafter, the degradation model 300 performs fleet-level deviation detection by comparing, at step 320, the sensor alignment result 252 to the fleet model 304. At step 322, the degradation detection model 300 determines whether the sensor alignment result 252 deviates from the fleet model 304 by more than the onboard degradation threshold. If the sensor alignment result 252 deviates from the fleet model 304 by more than the onboard degradation threshold, then the online sensor alignment system 200 triggers the offline degradation model 400.

If the sensor alignment result 252 does not deviate from the fleet model 304 by more than the onboard degradation threshold, then the degradation detection model 300 proceeds to step 330 and performs vehicle-level deviation detection by comparing the sensor alignment result 252 to the vehicle model 306. At step 332, the degradation detection model 300 determines whether the sensor alignment result 252 deviates from the vehicle model 306 by more than the onboard degradation threshold. If the sensor alignment result 252 deviates from vehicle model 306 by more than the onboard degradation threshold, then the online sensor alignment system 200 triggers the offline degradation model 400.

If the sensor alignment result 252 does not deviate from the vehicle model 306 by more than the onboard degradation threshold, then the degradation detection model 300 proceeds to step 340 and performs system-level deviation detection. Here, the system model 308 may additionally receive related system outputs 334 for the systems (e.g., perception system, automated parking, viewing system, etc.), of the vehicle 10 by comparing the related system outputs 334 to the system model 308. For example, when the system outputs 334 of the perception system of the vehicle 10 deviate from the system outputs for perception systems of other vehicles in the system model 308, the degradation detection model 300 may determine that the sensor alignment result 252 is inaccurate. At step 342, the degradation detection model 300 determines whether the sensor alignment result 252 deviates from the system model 308 by more than the onboard degradation threshold. If the sensor alignment result 252 deviates from system model 308 by more than the onboard degradation threshold, then the online sensor alignment system 200 triggers the offline degradation model 400. If the sensor alignment result 252 does not deviate from the system model 308 by more than the onboard degradation threshold, then the degradation detection model 300 determines that the sensor alignment result 252 does not indicate a misalignment, and takes no further action on the sensor alignment result 252.

Figure 4:
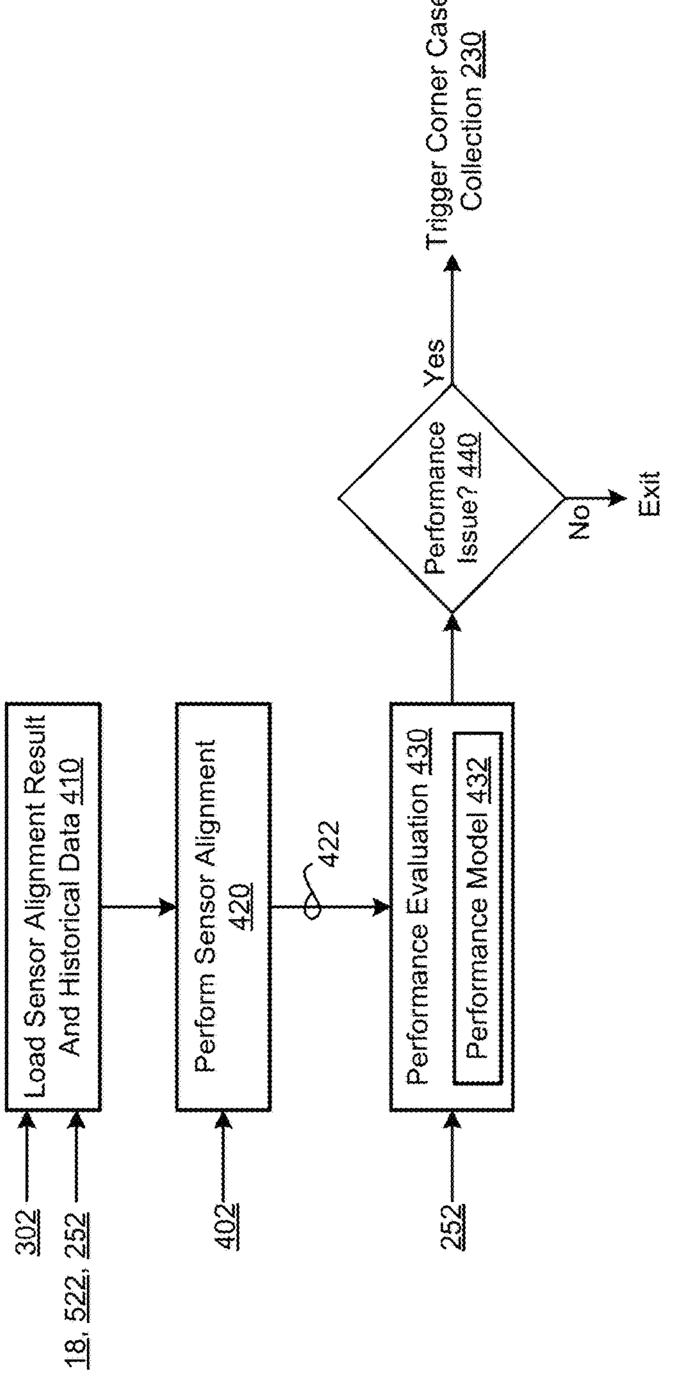
FIG. 4 is a flowchart of an example arrangement of operations for an offline degradation model of the system of FIG. 1.

With reference to FIGS. 2 and 4, the offline degradation model 400 receives, as input at step 410, the sensor data 18, the associated CTM 522, and the sensor alignment result 252, and confirms whether the deviation detected by the degradation detection model 300 indicates a misalignment of the sensor alignment result 252. In other words, the offline degradation model 400 determines whether the deviation between the sensor alignment result 252 and the onboard degradation threshold is outside of an expected variation of the model of the vehicle 10. In some implementations, the offline degradation model 400 includes a ground truth model 402 that is continuously trained offline to provide a complex and highly accurate alignment model for the model of the vehicle 10. As such, the ground truth model 402 may be configured or tailored based on each model vehicle.

At step 420, the offline degradation model 400 may perform sensor alignment using the ground-truth model 402 to process the sensor data 18 of the vehicle 10 and generate an offline model result 422. For example, the offline degradation model 400 may replay the sensor data 18 in the ground-truth model 402 to generate the offline model result 422. At step 430, the offline degradation model 400 performs performance evaluation by comparing the sensor alignment result 252 to the offline model result 422 generated by the ground-truth model 402. In particular, the offline degradation model 400 may provide, as input to a performance model 432, the sensor alignment result 252 and the offline model result 422 generated by the ground-truth model 402, and receive, as output from the performance model 432, an indication that a deviation between the sensor alignment result 252 and the offline model result 422 exceeds an offline degradation threshold. The offline degradation threshold may be configurable based on a model of the vehicle 10, and may be established during the manufacturing process of the vehicle 10. Additionally or alternatively, the system performance monitoring module 270 pushes updates to the offline degradation threshold (e.g., in response to a change in performance of the vehicle 10).

In some implementations, the performance model 432 includes a machine learning (ML) model, such as, without limitation, a large language model (LLM). In other implementations, the performance model 432 includes a rule-based model that identifies discrepancies between the sensor alignment result 252 and the offline model result 422. At step 440, the offline degradation model 400 determines whether the sensor alignment result 252 deviates from the offline model result 422 by more than the offline degradation threshold. If the sensor alignment result 252 deviates from the offline model result 422 by more than the offline degradation threshold, then the online sensor alignment system 200 triggers the corner case collection module 230. If the sensor alignment result 252 does not deviate from the offline model result 422 by more than the offline degradation threshold, then the offline degradation model 400 determines that the sensor alignment result 252 does not indicate a misalignment, and takes no further action on the sensor alignment result 252.

With continued reference to FIG. 2, after the online sensor alignment system 200 confirms, via the degradation detection model 300 and the offline degradation model 400, that the CTM 522 and the sensor alignment result 252 indicate a misalignment, the corner case collection module 230 may receive, as input, the context 20 of the vehicle 10, and correlate the context 20 of the vehicle 10 with an onboard alignment status of the sensor system 16. Here, the corner case collection module 230 may identify correlations with a low confidence (e.g., low quality sensor alignment results 252, or no sensor alignment results 252), and collect additional sensor data 18 from the sensor system 16 that is associated with the context 20 of the vehicle 10. For example, in some implementations, the corner case collection module 230 adds or removes the sensor data 18 and the context 20 to ensure that the online sensor alignment system 200 has high quality sensor data 18. In some implementations, in addition to being triggered by the offline degradation model 400, the corner case collection module 230 is periodically triggered to retrieve the higher quality sensor data 18 using the vehicle identification number (VIN) and the location information of the vehicle 10. Here, the vehicle 10 may download a frequency and priority of the sensor data collection trigger 232. The corner case collection module 230 may further update the sensor data collection trigger 232 based on the sensor data 18.

After the corner case collection module 230 is triggered, the offline alignment module 520 receives the additional sensor data 18, the associated CTM 522, and the sensor alignment result 252, and generates, based on the additional sensor data 18, a corrected CTM 522C. The offline alignment module 520 may thereafter communicate the corrected CTM 522C to the vehicle 10. In some implementations, the offline alignment module 520 additionally updates additional algorithms onboard the vehicle 10.

Figure 5A:
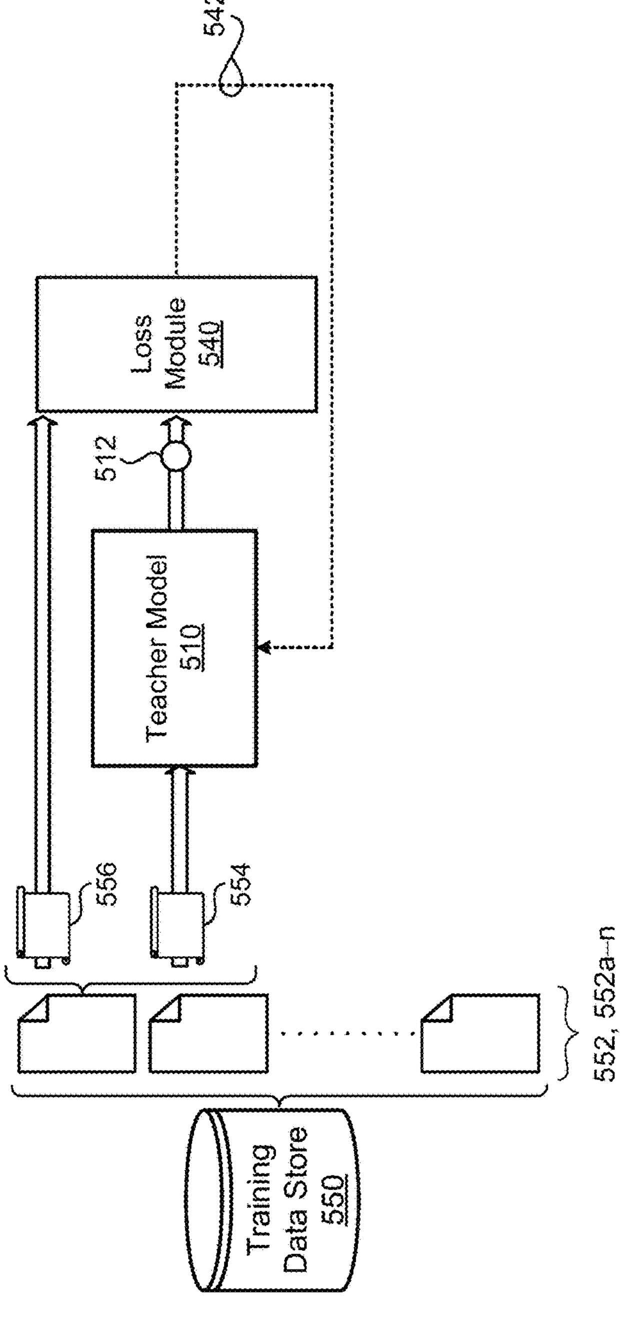
FIG. 5A is a schematic view of an example training process for promoting a teacher model to learn consistent predictions.
Figure 5B:
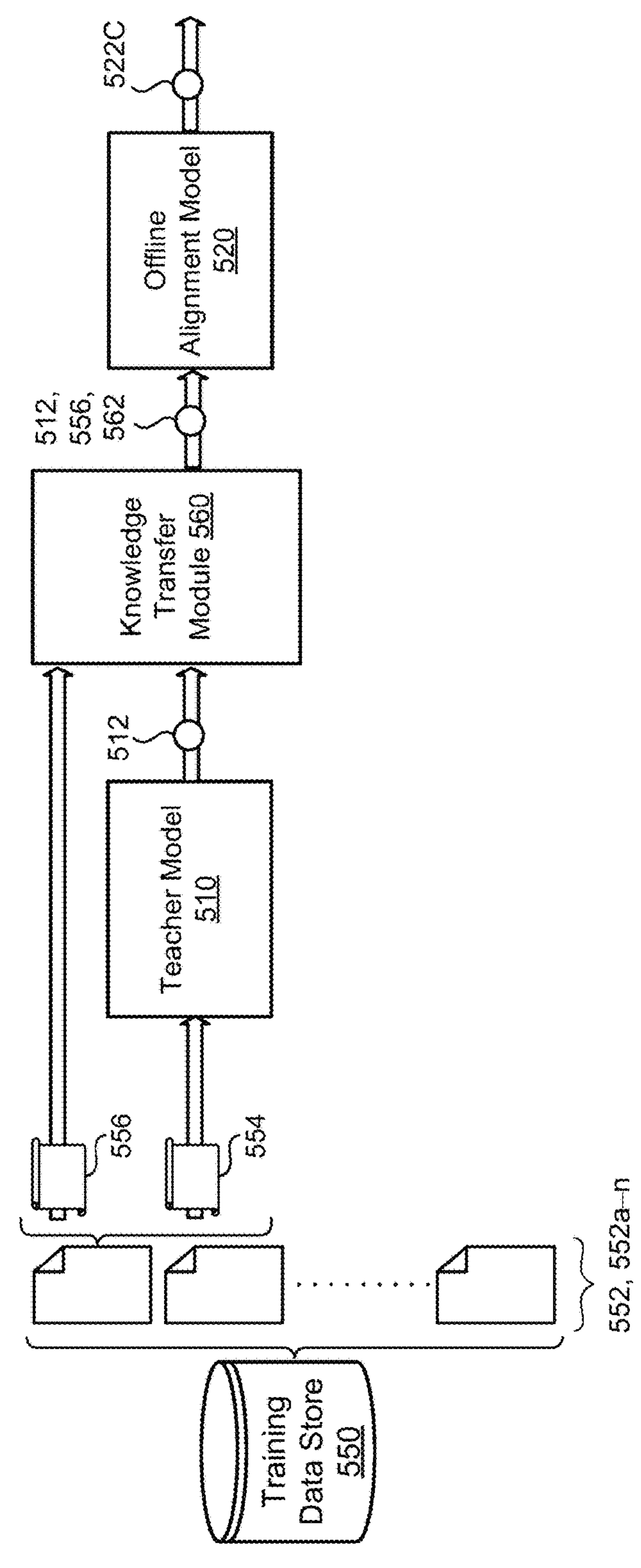
FIG. 5B is a schematic view of an example training process for promoting an offboard alignment model to learn consistent predictions.

Referring to FIGS. 5A and 5B, the offline alignment module 520 may include a student model trained by a teacher model 510 to generate the corrected CTM 522C based on the sensor data 18 and the additional sensor data 18. Here, the offline alignment module 520 maybe trained in a two-stage training process 500*a*, 500*b*. Alternatively, the offline alignment module 520 is trained in a single end-to-end training process. The training processes 500*a*, 500*b* may execute on the remote system 60 of FIG. 1. As shown, the training processes 500*a*, 500*b* obtain one or sets of training data 552 stored in a training data store 550 and trains the teacher model 510 and the offline alignment model 520 on the sets of training data 552 to generate the corrected CTM 522C. The training data store 550 may reside on the memory hardware 64 of the remote system 60. Each set of training data 552 includes training sensor data 554 paired with a corresponding ground-truth 556 of the corrected CTM 522. In some examples, the corresponding ground-truth 556 may include body pixel identifications detected by the sensor system 16 of the vehicle 10.

During the first stage, the training process 500*a* trains the teacher model 510 to predict a training correction 512 including a corrected CTM 522C. In particular, for each training task in the set of training data 552, the teacher model 510 processes the training sensor data 554 to generate the corresponding training correction 512 as a predicted output. A loss module 540 of the training process 500*a* receives, as input, the corresponding ground-truth 556 and the predicted training correction 512, and determines a training loss 542 based on the predicted training correction 512 and the corresponding ground-truth 556. Thereafter, the training process 500*a* may fine-tune, using the training loss 542, the teacher model 510.

Referring to FIG. 5B, after the teacher model 510 is trained, the second stage may include the training process 500*b* that distills the fully trained teacher model 510 into the offline alignment model 520 (also referred to as the student model 520). The training process 500*b* may include a knowledge transfer module 560 that receives, as input, the training correction 512 and generates, as output, a distilled output 562 configured to transfer the knowledge from the fully trained teacher model 510 to the offline alignment model 520. In some examples, the knowledge transfer module 560 includes an extraction layer output from the final layer of the teacher model 510. In some implementations, the offline alignment module 520 has fewer parameters than the fully trained teacher model 510. The training process 500*b* may train the offline alignment model 520 to receive, as input, the sensor data 18 and the additional sensor data 18 and generate, as output, the corrected CTM 522C by maximizing an inlier ratio.

Referring again to FIG. 2, the trained offline alignment model 520 receives, as input, the sensor data 18 and the additional sensor data 18, and generates, as output, the corrected CTM 522C. The trained offline alignment model 520 may share the corrected CTM 522C with the vehicle 10 by sending the corrected CTM 522C to the update module 240. The update module 240 may then correct/update the onboard CTM 522. Thereafter, the onboard alignment module 250 may run sensor alignment onboard using the corrected CTM 522C. Notably, the system performance monitoring module 270 may receive the corrected CTM 522C, as well as the sensor data 18, the context 20, the sensor alignment result 252 and the historical alignment data 302 and perform monitoring and analysis of the online sensor alignment system 200. For example, an engineering team may manually monitor and analyze the data generated by the online sensor alignment system 200 via the system performance monitoring module 270. For example, the engineering team may perform additional analysis to understand the performance of the online sensor alignment system 200, to determine any updates to the online sensor alignment system 200 that may correct deficiencies or inefficiencies, and whether system updates are needed in the next generation of design. Additionally or alternatively, the system performance monitoring module 270 automatically (i.e., without, or with limited human intervention) monitors and analyzes the online sensor alignment system 200.

Figure 6:
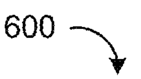
FIG. 6 is a flowchart of an example arrangement of operations for a method of system learning updates for online sensor alignment.
Figure 6:
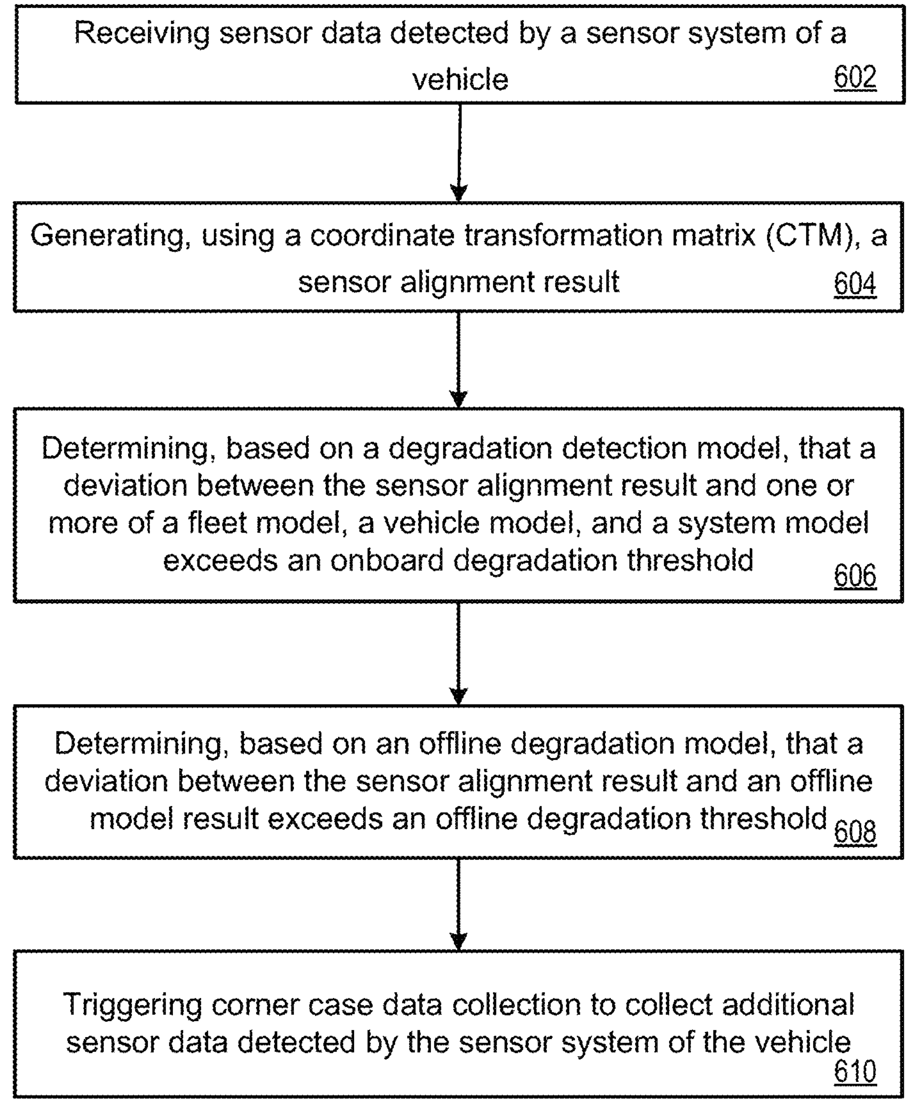

FIG. 6 includes a flowchart of an example arrangement of operations for a method 600 of system learning updates for online sensor alignment. The method 600 may be described with reference to FIGS. 1-5B. Data processing hardware (e.g., data processing hardware 12, 62 of FIG. 1) may execute instructions stored on memory hardware (e.g., memory hardware 14, 64 of FIG. 1) to perform the example arrangement of operations for the method 600.

At operation 602, the method 600 includes receiving sensor data 18 detected by a sensor system 16 of a vehicle 10. The method 600 also includes, at operation 604, generating, using a coordinate transformation matrix (CTM) 522, a sensor alignment result 252. At operation 606, the method 600 also includes determining, based on a degradation detection model 300, that a deviation between the sensor alignment result 252 and one or more of a fleet model 304, a vehicle model 306, and a system model 308 exceeds an onboard degradation threshold.

At operation 608, the method 600 also includes determining, based on an offline degradation model 400, that a deviation between the sensor alignment result 252 and an offline model result 422 exceeds an offline degradation threshold. The method 600 also includes, at operation 610, triggering corner case data collection to collect additional sensor data 18 detected by the sensor system 16 of the vehicle 10.

A number of implementations have been described. Nevertheless, it will be understood that various modifications may be made without departing from the spirit and scope of the disclosure. Accordingly, other implementations are within the scope of the following claims.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A computer-implemented method when executed on data processing hardware causes the data processing hardware to perform operations comprising:

receiving sensor data detected by a sensor system of a vehicle;

generating, using a coordinate transformation matrix (CTM), a sensor alignment result;

determining, based on a degradation detection model, that a deviation between the sensor alignment result and one or more of a fleet model, a vehicle model, and a system model exceeds an onboard degradation threshold;

determining, based on an offline degradation model, that a deviation between the sensor alignment result and an offline model result exceeds an offline degradation threshold; and triggering corner case data collection to collect additional sensor data detected by the sensor system of the vehicle.

2. The method of claim 1, wherein the operations further comprise:

generating, based on the additional sensor data, a corrected CTM; and communicating the corrected CTM to the vehicle.

3. The method of claim 2, wherein generating the corrected CTM and the updated sensor data collection trigger is based on an offline alignment model trained to generate the corrected CTM based on the sensor data and the additional sensor data.

4. The method of claim 1, wherein the fleet model comprises a statistical average fleet sensor alignment based on the sensor data.

5. The method of claim 1, wherein the vehicle model comprises a statistical average model sensor alignment of vehicle models similar to a model of the vehicle based on the sensor data.

6. The method of claim 1, wherein the system model comprises a statistical average sensor alignment of the sensor system of the vehicle based on the sensor data.

7. The method of claim 1, wherein determining, based on the offline degradation model, that the deviation between the sensor alignment result and the offline model result exceeds the offline degradation threshold comprises:

generating, using the offline degradation model, the offline model result;

providing, as input to a performance model, the sensor alignment result and the offline model result; and receiving, as output from the performance model, an indication that the deviation between the sensor alignment result and the offline model result exceeds the offline degradation threshold.

8. The method of claim 7, wherein the performance model comprises a machine learning model.

9. The method of claim 7, wherein the performance model comprises a rule-based model.

10. The method of claim 1, wherein triggering the corner case data collection to collect the additional sensor data comprises collecting a context of the vehicle.

11. A system comprising:

data processing hardware; and memory hardware in communication with the data processing hardware, the memory hardware storing instructions that when executed on the data processing hardware cause the data processing hardware to perform operations comprising:

receiving sensor data detected by a sensor system of a vehicle;

generating, using a coordinate transformation matrix (CTM), a sensor alignment result;

determining, based on a degradation detection model, that a deviation between the sensor alignment result and one or more of a fleet model, a vehicle model, and a system model exceeds an onboard degradation threshold;

determining, based on an offline degradation model, that a deviation between the sensor alignment result and an offline model result exceeds an offline degradation threshold; and triggering corner case data collection to collect additional sensor data detected by the sensor system of the vehicle.

12. The system of claim 11, wherein the operations further comprise:

generating, based on the additional sensor data, a corrected CTM; and communicating the corrected CTM to the vehicle.

13. The system of claim 12, wherein generating the corrected CTM and the updated sensor data collection trigger is based on an offline alignment model trained to generate the corrected CTM based on the sensor data and the additional sensor data.

14. The system of claim 11, wherein the fleet model comprises a statistical average fleet sensor alignment based on the sensor data.

15. The system of claim 11, wherein the vehicle model comprises a statistical average model sensor alignment of vehicle models similar to a model of the vehicle based on the sensor data.

16. The system of claim 11, wherein the system model comprises a statistical average sensor alignment of the sensor system of the vehicle based on the sensor data.

17. The system of claim 11, wherein determining, based on the offline degradation model, that the deviation between the sensor alignment result and the offline model result exceeds the offline degradation threshold comprises:

generating, using the offline degradation model, the offline model result;

providing, as input to a performance model, the sensor alignment result and the offline model result; and receiving, as output from the performance model, an indication that the deviation between the sensor alignment result and the offline model result exceeds the offline degradation threshold.

18. The system of claim 17, wherein the performance model comprises a machine learning model.

19. The system of claim 17, wherein the performance model comprises a rule-based model.

20. The system of claim 11, wherein triggering the corner case data collection to collect the additional sensor data comprises collecting a context of the vehicle.

* * * * *